US012340781B2

(12) United States Patent
Wang et al.

(10) Patent No.: US 12,340,781 B2
(45) Date of Patent: Jun. 24, 2025

(54) ELECTRONIC CYMBAL

(71) Applicant: NINGBO KINLIN ELECTRONIC TECHNOLOGY CO., LTD., Ningbo (CN)

(72) Inventors: Fuguo Wang, Ningbo (CN); Guan Wang, Ningbo (CN)

(73) Assignee: NINGBO KINLIN ELECTRONIC TECHNOLOGY CO., LTD., Ningbo (CN)

( * ) Notice: Subject to any disclaimer, the term of this patent is extended or adjusted under 35 U.S.C. 154(b) by 261 days.

(21) Appl. No.: 18/120,441

(22) Filed: Mar. 13, 2023

(65) Prior Publication Data

US 2023/0343308 A1 Oct. 26, 2023

(30) Foreign Application Priority Data

Apr. 24, 2022 (CN) ......................... 202220953806.2

(51) Int. Cl.
*G10D 13/02* (2020.01)
*G10D 13/10* (2020.01)
*G10H 1/32* (2006.01)

(52) U.S. Cl.
CPC ............... *G10D 13/26* (2020.02); *G10H 1/32* (2013.01); *G10H 2230/325* (2013.01)

(58) Field of Classification Search
CPC ..... G10D 13/26; G10H 1/32; G10H 2230/325
See application file for complete search history.

(56) References Cited

U.S. PATENT DOCUMENTS

| | | | | |
|---|---|---|---|---|
| 8,344,235 B2 * | 1/2013 | Steele | G10H 1/348 | 84/622 |
| 8,785,758 B2 * | 7/2014 | Wissmuller | G10H 3/146 | 84/615 |
| 8,865,987 B2 * | 10/2014 | Mori | G10D 13/18 | 84/415 |
| 9,082,375 B2 * | 7/2015 | Mori | G10D 13/26 | |
| 9,082,378 B2 * | 7/2015 | Miyashita | G10D 13/065 | |
| 2009/0139387 A1 * | 6/2009 | Toda | G10H 3/146 | 84/422.3 |
| 2022/0319475 A1 * | 10/2022 | Morita | G10D 13/26 | |
| 2023/0343308 A1 * | 10/2023 | Wang | G10D 13/06 | |

* cited by examiner

*Primary Examiner* — Robert W Horn
(74) *Attorney, Agent, or Firm* — Getech Law LLC; Jun Ye

(57) ABSTRACT

The present invention relates to the technical field of electronic music instruments, and provides an electronic cymbal which comprises a support piece and a cymbal body made of a soft elastic material. A through hole is disposed in the center of the cymbal body. A connection portion for connecting the cymbal body is disposed at an upper end of the support piece. The connection portion comprises a head portion and a support rod portion which are disposed from top down and integrally formed with the support piece. A size of an outer diameter of the support rod portion is less than sizes of outer diameters of the head portion and the support piece, and a limiting step is formed at a lower end of the support rod portion. The disclosed electronic cymbal provides a better beat feel, simple structure and ease of mounting.

13 Claims, 4 Drawing Sheets

ELECTRONIC CYMBAL

This application is based upon and claims priority to Chinese Patent Application No. 202220953806.2, filed on Apr. 24, 2022, the entire contents of which are incorporated herein by reference.

TECHNICAL FIELD

The present invention relates to the technical field of electronic music instruments and in particular to an electronic cymbal.

BACKGROUND

A cymbal is a music instrument. Most of traditional cymbals are made of an alloy mainly composed of copper. Along with development of the era and scientific progress, an electronic cymbal emerges.

A real cymbal may freely swing to some degree when it is beaten. However, the existing electronic cymbals can only provide a limited part for being beaten due to sensors and cables. Therefore, they cannot produce the same swings as the real cymbals, and nor produce corresponding tone colors when beaten on edges. Therefore, they cannot give a beater the same hand-feel as the real cymbal. Furthermore, a beater, once adapting to beating the electronic cymbals, cannot adapt to the swing of the real cymbals during use, that is, the beater cannot freely switch between the real cymbals and the electronic cymbals, leading to a poor experience for both of them.

An electronic cymbal in the prior art comprises a cymbal body and a support piece. The cymbal body is fixedly locked on a connection piece. Therefore, during connection process, a wrench is needed to tighten the connection piece, leading to complex process and inconvenience of mounting. The cymbal body comprises an external surface body for being beaten and a sensing element carrier connected thereto. During mounting of the cymbal body, it is required to open a stepped through hole between the external surface body and the sensing element carrier so as to fixedly connect both together by use of a bolt. During the process, a screw driver is needed to achieve locking up. The existing electronic cymbal is structurally complex and has many parts and therefore several types of tools are needed during an assembly process. The present invention is provided here to solve these defects.

SUMMARY

In order to overcome the above technical defects, the present invention provides an electronic cymbal which can provide a better beat feel, simple structure and ease of mounting.

In order to achieve the above purpose, the present invention is implemented by the following solution. There is provided an electronic cymbal comprising a support piece and a cymbal body made of a soft elastic material. A through hole is disposed in the center of the cymbal body. A connection portion for connecting the cymbal body is disposed at an upper end of the support piece. The connection portion comprises a head portion and a support rod portion which are disposed from top down and integrally formed with the support piece. A size of an outer diameter of the support rod portion is less than sizes of outer diameters of the head portion and the support piece, and a limiting step is formed at a lower end of the support rod portion. A size of a hole diameter of the through hole is less than the size of the outer diameter of the head portion and greater than the size of the outer diameter of the support rod portion. The through hole of the cymbal body is sleeved on the support rod portion through the head portion, and the cymbal body is axially limited on the support rod portion between the head portion and the limiting step.

The present invention has the following advantages and beneficial effects: the cymbal body is made of a soft elastic material to enable the cymbal body to have a particular elasticity. A through hole is disposed in the center of the cymbal body, and a connection portion for connecting the cymbal body is disposed at an upper end of a support piece. The connection portion comprises a head portion and a support rod portion which are disposed from top down and integrally formed with the support piece, which can be processed out through one working procedure, bringing ease of processing and increasing entire consistency while ensuring no loosening occurs to the connection position during swing of the cymbal body. In this way, sturdiness and durability are improved. A size of an outer diameter of the support rod portion is less than sizes of outer diameters of the head portion and the support piece, and a limiting step is formed at a lower end of the support rod portion. In this case, the integrally formed connection portion can improve the entire consistency and reduce the number of corresponding parts at the same time, resulting in simpler structure. A size of a hole diameter of the through hole is less than the size of the outer diameter of the head portion and greater than the size of the outer diameter of the support rod portion. In this way, the cymbal body can swing on the support rod portion, so as to give a beater of the electronic cymbal a feel of beating a real cymbal, thus improving the comfort of beat. When the through hole of the cymbal body is sleeved on the support rod portion through the head portion, since the cymbal body may deform due to elasticity, the through hole will expand when the head portion passes and restore to normal size after the cymbal body enters the support rod portion. In this way, the cymbal body is axially limited on the support rod portion between the head portion and the limiting step, and thus no other tools are needed to mount the cymbal body onto the support rod portion of the connection portion, bringing convenience to the mounting process.

Preferably, the cymbal body comprises a cymbal cover, a cymbal base and a mounting seat which are sequentially connected from top down. The cymbal base is connected with a circuit board for controlling transmission of audio signals and vibration signals and an audio interface connectable with a sound source is disposed on the circuit board. At least three buzzing sheets distributed along a circumferential direction of the cymbal base are connected on the cymbal base, the buzzing sheets are attached to a surface of the cymbal base, and the buzzing sheets are connected with each other in parallel and electrically connected with the circuit board. With this disposal, the at least three buzzing sheets distributed circumferentially can receive vibration of wider range, thereby expanding a sound reception range and improving a sound reception accuracy.

Preferably, an upwardly-convex first boss is disposed in the center of the cymbal cover. The first boss extends downwardly to form a flange boss including a first flange boss and a second flange boss. A second boss for connecting the flange boss is disposed in the center of the cymbal base, and the second boss penetrates through the second flange boss to connect with the first flange boss. With this disposal, the cymbal base wrapped in the cymbal cover such that both of them are fitted together more closely. When the cymbal cover receives a beat vibration, it can effectively convey the vibration to the buzzing sheets, increasing the sound reception effect and improving the beat feel of the beater.

Preferably, the first boss is provided with a plurality of first convex blocks distributed along a circumferential direction of the cymbal cover and protruded downwardly. The second flange boss is provided with a plurality of second convex blocks distributed along the circumferential direction of the cymbal cover and protruded upwardly. The second boss is provided with a plurality of first grooves for inserting the first convex blocks and the second boss is further provided with a plurality of second grooves for inserting the second convex blocks. With this disposal, the convex blocks are inserted into the grooves so as to prevent relative displacement of the cymbal cover and the cymbal base due to vibrations, thus ensuring stability in the beat process.

Preferably, an outer edge of the cymbal cover extends downwardly to form a turning edge so as to form an annular cavity for connecting an edge of the cymbal base. With this disposal, a beat vibration received by an edge of the cymbal body is converted into a corresponding tone color for outputting, thus improving the beat feel.

Preferably, a plurality of upwardly-protruding third convex blocks are disposed on the annular cavity, and a plurality of through grooves for inserting the third convex blocks are disposed on the cymbal base. With this disposal, the third convex blocks penetrate through the through grooves to firmly fix the cymbal base to the cymbal cover, increasing entire structural strength.

Preferably, the cymbal cover and the cymbal base form the cymbal body through secondary injection molding. The support rod portion comprises a first waist portion and a second waist portion connected below the first waist portion. With this disposal, secondary injection molding can improve the consistency of the cymbal cover and the cymbal base and at the same time, the mounting steps can be reduced, thus improving production efficiency and saving human labor. The cymbal body will finally enter the second waist portion through a transitional waist portion. The cymbal body, after entering the first waist portion, can more smoothly enter the second waist portion with the first waist portion as a transition.

Preferably, the first waist portion is shaped like cone with an upper part being large and a lower part being small, and the second waist portion is cylindrical. With this disposal, the conical structure can allow the cymbal body to undergo a gradual shrinking guide process when entering the second waist portion, thus mounting the cymbal body more easily.

Preferably, the first waist portion is in the form of concave arc shape, such that the external surfaces of the head portion, the first waist portion and the second waist portion are smoothly transitioned. With this disposal, the structure of concave arc shape can ensure the cymbal body can swing in the connection portion at the same angle as the real cymbal, thus allowing the beater of the real cymbal to better adapt to the beat of the electronic cymbal. Further, the smoothly transitional surfaces allow the cymbal body to enter more quickly and easily.

Preferably, the upper end of the head portion is formed into a hemisphere. With this disposal, the hemisphere design may allow the connection portion to pass through the elastic through hole more smoothly by pressing the cymbal body while unnecessary locking actions can be reduced. As long as the cymbal body is directly pressed to the support rod portion through the through hole, the entire mounting process can be completed, bringing much convenience.

Numerals of drawings are described below: 1. support piece, 101. connection portion, 102. limiting step, 1011. head portion, 1012. support rod portion, 1013. first waist portion, 1014. second waist portion;

2. cymbal body, 201. through hole;

3. cymbal cover, 301. first boss, 302. first flange boss, 303. second flange boss, 304. first convex block, 305. second convex block, 306. turning edge, 307. annular cavity, 308. third convex block;

4. cymbal base, 401. second boss, 402. first groove, 403. second groove, 404. through groove, 505. mounting seat, 6. circuit board, 601. audio interface, 602. buzzing sheet.

EMBODIMENTS

The technical solution of the embodiments of the present invention will be fully and clearly described in combination with the above accompanying drawings. Apparently, the embodiments described herein are merely some of the present invention rather than all the embodiments. All other embodiments obtained by those skilled in the art based on these drawings of the present invention without making creative work shall fall within the scope of protection of the present invention.

Figure 1:
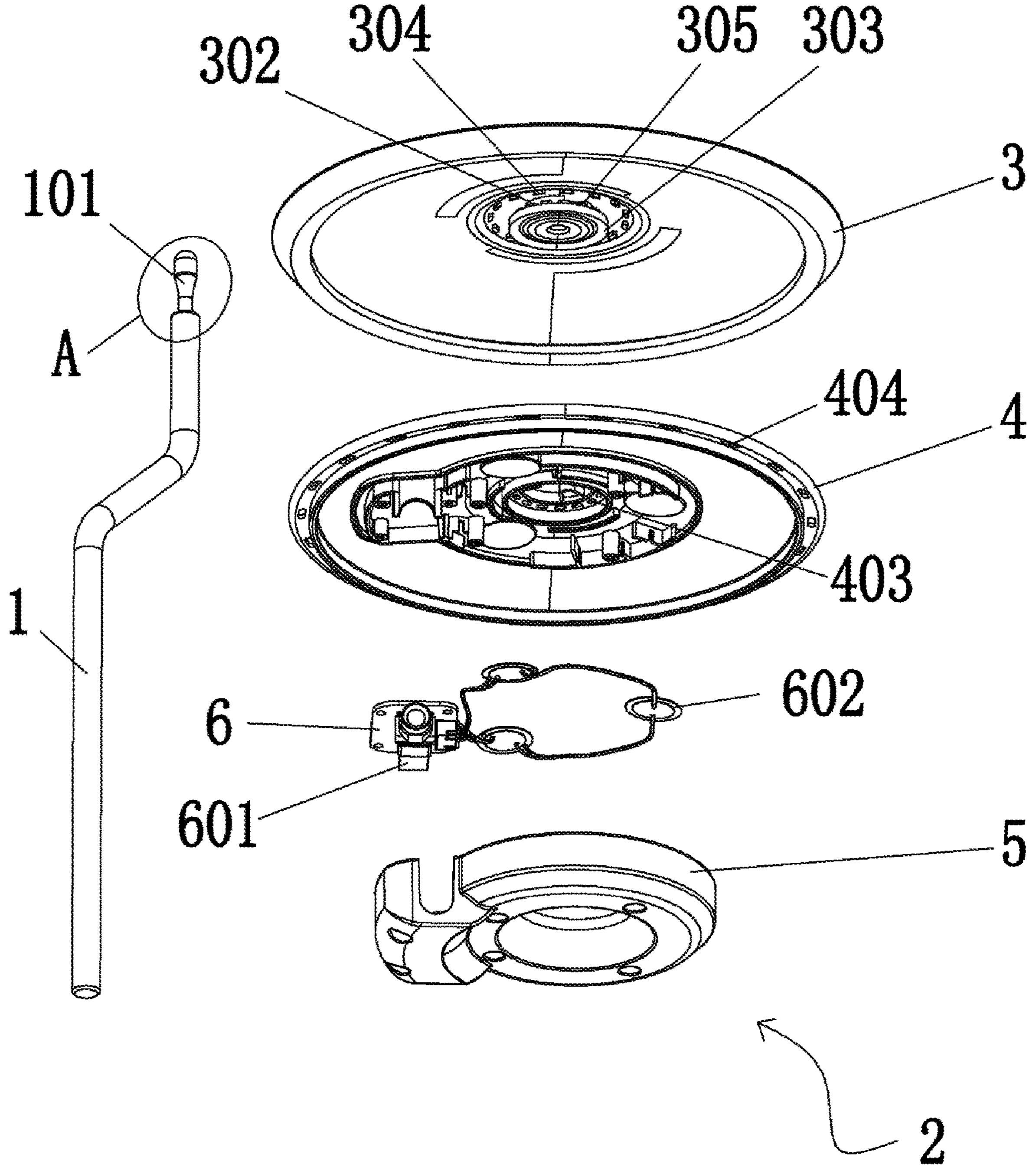
FIG. 1 is an exploded view of an electronic cymbal according to the present invention.
Figure 2:
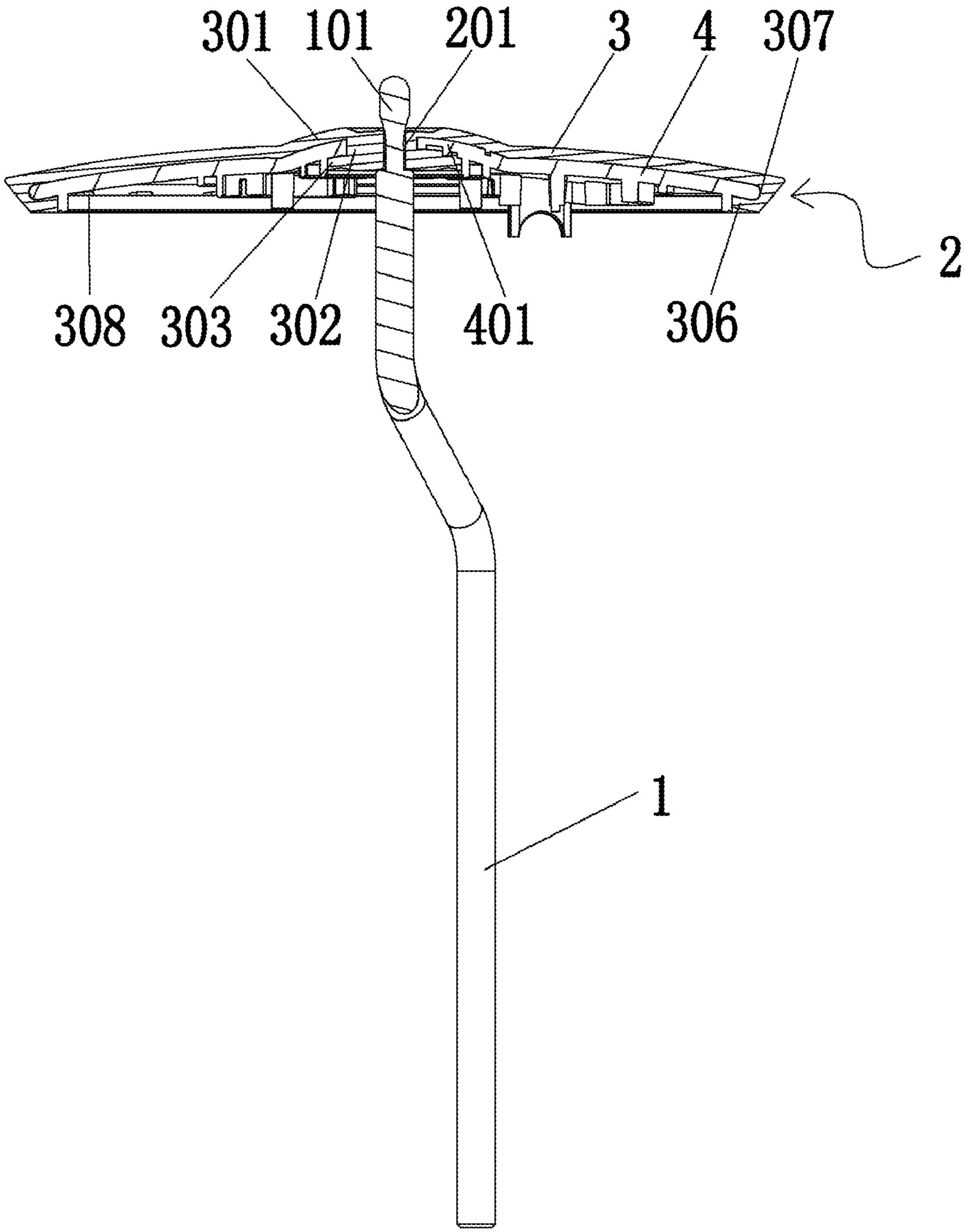
FIG. 2 is a half section view of an electronic cymbal according to the present invention.

As shown in FIGS. 1 and 2, an embodiment of the present invention provides an electronic cymbal which can be easily mounted. The electronic cymbal comprises a cymbal body 2 and a support piece 1. A through hole 201 is disposed in the middle part of the cymbal body 2. A cymbal cover 3 of the cymbal body 2 is made of a soft elastic material, such that the beat surface of the cymbal body 2 has a particular elasticity. When beaten, the beat surface can feed back a rebound force to a beater like a real cymbal. Further, the service life of the electronic cymbal can be increased and thus the electronic cymbal will not be damaged after several times of use.

Figure 5:
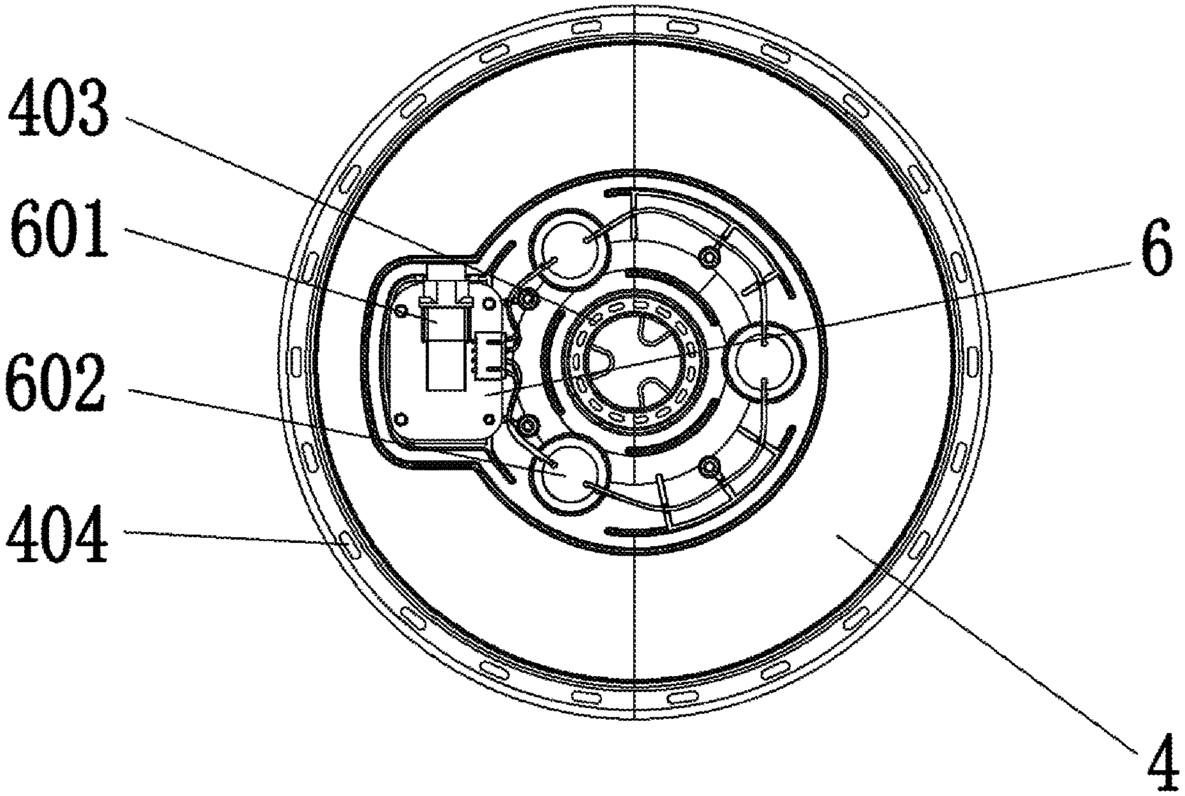
FIG. 5 is a bottom view of a cymbal base of an electronic cymbal according to the present invention.

As shown in FIG. 5, a connection portion 101 is fixedly connected to an upper end of the support piece 1 and the connection portion 101 comprises a head portion 1011 and a support rod portion 1012. The head portion 1011 is disposed at an upper end of the support rod portion 1012. The cymbal body 2 may be directly enabled to enter the support rod portion 1012 by passing the head portion 1011 through a through hole 201, and a limiting step 102 for limiting the cymbal body 2 from axially falling off is disposed on the support rod portion 1012. The cymbal body 2 is in a clearance fit with the support rod portion 1012, such that the cymbal body 2 can swing on the support rod portion 1012 after being beaten, thus giving a beater of the electronic cymbal a feel of beating a real cymbal and improving a beat feel. Furthermore, during a mounting process, other tools and connection pieces are not needed, and the cymbal body 2 can be directly pressed to allow the head portion 1011 to pass through the cymbal body 2 so as to complete the mounting. Therefore, the electronic cymbal is simple in structure and easy to mount. A size of a hole diameter of the through hole 201 is less than a size of an outer diameter of the head portion 1011 and a size of an outer diameter of the support piece 1, and thus it can be guaranteed that the cymbal body 2 will not separate from the connection portion 101 due to swing.

As shown in FIG. 1, in the electronic cymbal of the embodiment, in order to increase a beat feel and improve an entire sound reception effect, the cymbal body 2 comprises a cymbal cover 3, a cymbal base 4 and a mounting seat 5 which are sequentially connected from top down. The cymbal base 4 is connected with a circuit board 6 for controlling transmission of audio signals and vibration signals, and an audio interface 601 connectable with a sound source is disposed on the circuit board 6. At least three buzzing sheets 602 distributed along a circumferential direction of the cymbal base 4 are connected on the cymbal base 4, the buzzing sheets 602 are attached to a surface of the cymbal base 4, and the buzzing sheets 602 are connected with each other in parallel and electrically connected with the circuit board 6. When one of the buzzing sheets 602 is damaged, the electronic cymbal can be still used normally. Subsequently, repair can be completed by replacing the buzzing sheet 602 and thus it is not required to replace the entire electronic cymbal, thereby saving costs. Further, a tone color produced by beating a same part of the real cymbal can be conveyed to the beater through the sound source, allowing the beater of the real cymbal to quickly adapt to the electronic cymbal.

As shown in FIG. 2, in order to further optimize the above solution, an outer edge of the cymbal cover 3 extends downwardly to form a turning edge 306 so as to form an annular cavity 307 for connecting an edge of the cymbal base 4. When an edge of the cymbal body 2 is beaten, a corresponding vibration can be received and a tone color of a corresponding part is fed back to the beater under the control of the circuit board, thus improving the beat feel of the beater.

In the electronic cymbal of the embodiment, in order to increase an entire sturdiness and improve the beat stability, an upwardly-convex first boss 301 is disposed in the center of the cymbal cover 3. The first boss 301 extends downwardly to form a flange boss including a first flange boss 302 and a second flange boss 303. A second boss 401 for connecting the flange boss is disposed in the center of the cymbal base 4, and the second boss 401 penetrates through the second flange boss 303 to connect with the first flange boss 302, thus increasing the sturdiness of the cymbal cover 3 and the cymbal base 4.

Figure 4:
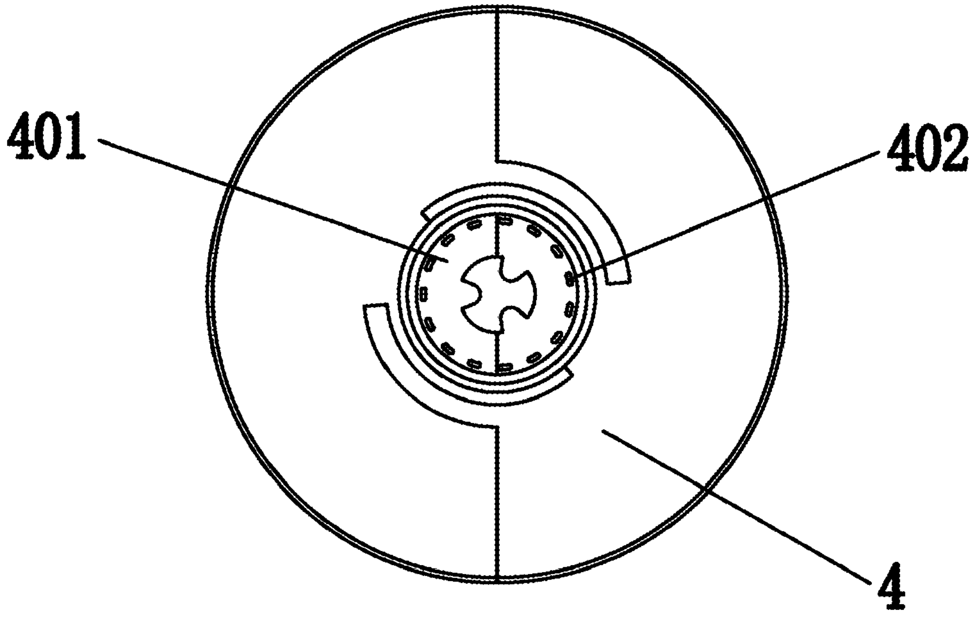
FIG. 4 is a top view of a cymbal base of an electronic cymbal according to the present invention.

As shown in FIGS. 4 and 5, in order to further optimize the above solution, the first boss 301 is provided with a plurality of first convex blocks 304 distributed along a circumferential direction of the cymbal cover 3 and protruded downwardly. The second flange boss 303 is provided with a plurality of second convex blocks 305 distributed along the circumferential direction of the cymbal cover 3 and protruded upwardly. The second boss 401 is provided with a plurality of first grooves 402 for inserting the first convex blocks 304 and the second boss 401 is further provided with a plurality of second grooves 403 for inserting the second convex blocks 305. In this way, the cymbal base 4 and the cymbal cover 3 will not displace when receiving vibration, thereby ensuring the relative position of both of them.

In order to further optimize the above solution, a plurality of upwardly-protruding third convex blocks 308 are disposed on the annular cavity 307, and a plurality of through grooves 404 for inserting the third convex blocks 308 are disposed on the cymbal base 4. In this way, the stability between the cymbal base 4 and the cymbal cover 3 when the edge is beaten can be improved.

In order to further optimize the above solution, the cymbal cover 3 and the cymbal base 4 form the cymbal body 2 through secondary injection molding. By the secondary injection molding, the entire consistency of both can be improved, and the structural strength and stability can be increased. At the same time, the production efficiency can be increased and unnecessary mounting steps can be reduced, thus saving human labor.

Figure 3:
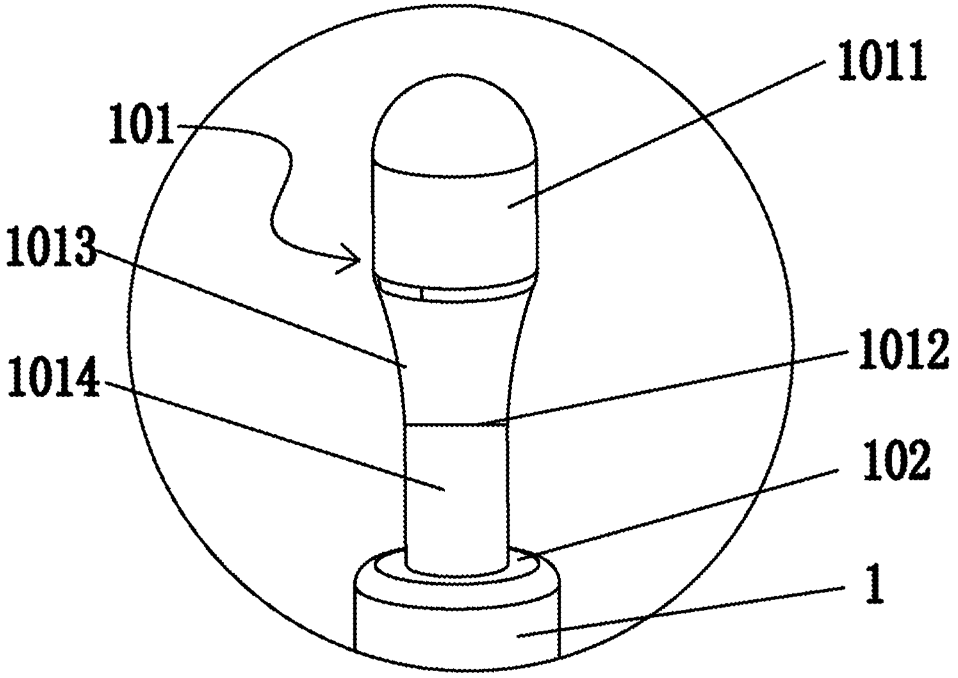
FIG. 3 is an enlarged view of a position A in FIG. 1.

As shown in FIG. 3, in the electronic cymbal of the embodiment, in order to facilitate mounting and extend the service life of the electronic cymbal, the connection portion 101 comprises a head portion 1011 and a support rod portion 1012 and an upper end of the head portion 1011 is formed into a hemisphere. With this disposal, the head portion 1011 may easily pass through the cymbal body 1 under the guide of the hemispheric head portion 1011, thus reducing the burden of the workers. In this way, the mounting of the cymbal body 2 can be completed with less force. The support rod portion 1012 comprises a first waist portion 1013 and a second waist portion 1014. The first waist portion 1013 is a concave arc shape shrinking gradually downwardly along an axial direction of the connection portion 101, such that the head portion 101 is smoothly transitioned to the second waist portion 1014 through the first waist portion 1012 taking the concave arc shape. With disposal of the first waist portion 1013 and the second waist portion 1014 on the support rod portion 1012, the cymbal body 2 is allowed to swing on the support rod portion 1012 of the connection portion 101 at the same angle as a real cymbal, thus improving the beat feel, reducing processing procedures and increasing the mounting efficiency.

In order to further optimize the above solution, the connection portion 101 is entirely processed by integral formation process, bringing great conveniences to the production, reducing processing procedures, increasing assembly efficiency and speeding up production efficiency.

In the electronic cymbal of this embodiment, in order to facilitate mounting, the connection portion 101 and the support piece 1 are processed by integral formation process, so as to reduce processing steps, increase assembly efficiency, speed up production efficiency. Further, the service life of the product can be guaranteed and unnecessary locking actions and use of parts can be reduced so as to facilitate mounting.

In an optimal embodiment of the present invention, the cymbal body 2 comprises a cymbal cover 3, a cymbal base 4 and a mounting seat 5 sequentially connected from top down. The cymbal base 4 is connected with a circuit board 6 for controlling transmission of audio signals and vibration signals, and an audio interface 601 connectable with a sound source is disposed on the circuit board 6. Three buzzing sheets 602 distributed along a circumferential direction of the cymbal base 4 are connected on the cymbal base 4 and the buzzing sheets 602 are spaced apart by an angle of 120 degrees. The buzzing sheets 602 are attached to a surface of the cymbal base 4 and bonded to corresponding buzzing sheet grooves by glue. Further, the buzzing sheets 602 are connected with each other in parallel, with a wire connected to an end of an insertion piece, and the other end of the insertion piece is connected to the circuit board 6. An upwardly-convex first boss 301 is disposed in the center of the cymbal cover 3. The first boss 301 extends downwardly to form a flange boss including a first flange boss 302 and a second flange boss 303. A second boss 401 for connecting the flange boss is disposed in the center of the cymbal base 4, and the second boss 401 penetrates through the second flange boss 303 to connect with the first flange boss 302. The first boss 301 is provided with 15 first convex blocks 304 distributed along the circumferential direction of the cymbal cover 3 and protruded downwardly, and the second flange boss 303 is provided with 15 second convex blocks 305 distributed along the circumferential direction of the cymbal cover 3 and protruded upwardly. The second boss 401 is provided with 15 first grooves 402 for inserting the first convex blocks 304, and the second boss 401 is further provided with 15 second grooves 403 for inserting the second convex blocks 305. An outer edge of the cymbal cover 3 extends downwardly to form a turning edge 306 so as to form an annular cavity 307 for connecting an edge of the cymbal base 4. The annular cavity 307 is provided with 22 upwardly-protruding third convex blocks 308 and the cymbal base 4 is provided with 22 through grooves 404 for inserting the third convex blocks 308. With the cymbal base 4 as base material, the cymbal cover 3 is produced by secondary injection molding to form the cymbal body 2. The cymbal body 2 is in clearance fit with the support rod portion 1012 of the connection portion 101 through the through hole 201. The size of the outer diameter of the support rod portion 1012 is less than the size of the outer diameter of the head portion 1011 and the size of the outer diameter of the support piece 1, and a limiting step 102 is formed at a lower end of the support rod portion 1012. The size of the hole diameter of the through hole 201 is less than the size of the outer diameter of the head portion 1011 and greater than the size of the outer diameter of the support rod portion 1012. When the cymbal body 2 is sleeved on the support rod portion 1012 by passing the head portion 1011 through the through hole 201, the cymbal body 2 is axially limited on the support rod portion 1012 between the head portion 1011 and the limiting step 102. The support rod portion 1012 comprises a first waist portion 1013 and a second waist portion 1014 formed integrally. An upper end of the head portion 1011 is formed into a hemisphere. At the connection of the head portion 1011 and the support rod portion 1012 is the first waist portion 1013 which is in a concave arc shape gradually shrinking downwardly along an axial direction of the connection portion 101 and smoothly transitioned downwardly to the second waist portion 1014. The head portion 1011 and the support rod portion 1012 of the connection portion 101 are processed by integral formation process. The completed cymbal body 2 is sleeved onto the second waist portion 1014 of the support rod portion 1012 through the through hole 201, and the connection portion 101 and the support piece 1 are integrally formed.

The embodiments of the present invention are described in a progressive manner and each embodiment focuses on descriptions of differences from other embodiments with same or similar parts referred to each other.

By use of the above descriptions of the embodiments of the present invention, those skilled in the art can implement or use the present invention. Multiple modifications for the embodiments of the present invention are apparent for those skilled in the art. The general principle defined in the present invention can be implemented in other embodiments without departing from the spirit or scope of the present invention. Therefore, the present invention is not limited to these embodiments of the present invention but complies with the widest scope consistent with the principle and novel features of the present invention.

The invention claimed is:

1. An electronic cymbal, comprising a support piece (1) and a cymbal body (2) made of a soft elastic material; a through hole (201) is disposed in the center of the cymbal body (2), wherein a connection portion (101) for connecting the cymbal body (2) is disposed at an upper end of the support piece (1); the connection portion (101) comprises a head portion (1011) and a support rod portion (1012) which are disposed from top down and integrally formed with the support piece (1); the size of an outer diameter of the support rod portion (1012) is less than sizes of outer diameters of the head portion (1011) and the support piece (1), and a limiting step (102) is formed at a lower end of the support rod portion (1012); the size of a hole diameter of the through hole (201) is less than the size of the outer diameter of the head portion (1011) and greater than the size of the outer diameter of the support rod portion (1012); the through hole (201) of the cymbal body (2) is sleeved on the support rod portion (1012) through the head portion (1011), and the cymbal body (2) is axially limited on the support rod portion (1012) between the head portion (1011) and the limiting step (102), wherein the cymbal body (2) comprises a cymbal cover (3), a cymbal base (4) and a mounting seat (5) which are sequentially connected from top down; the cymbal base (4) is connected with a circuit board (6) for controlling transmission of audio signals and vibration signals and an audio interface (601) connectable with a sound source is disposed on the circuit board (6); at least three buzzing sheets (602) distributed along a circumferential direction of the cymbal base (4) are connected on the cymbal base (4), the buzzing sheets (602) are attached to a surface of the cymbal base (4), and the buzzing sheets (602) are connected with each other in parallel and electrically connected with the circuit board (6).

2. The electronic cymbal of claim 1, wherein an upwardly-convex first boss (301) is disposed in the center of the cymbal cover (3); the first boss (301) extends downwardly to form a flange boss; the flange boss comprises a first flange boss (302) and a second flange boss (303); a second boss (401) for connecting the flange boss is disposed in the center of the cymbal base (4), and the second boss (401) penetrates through the second flange boss (303) to connect with the first flange boss (302).

3. The electronic cymbal of claim 2, wherein the first boss (301) is provided with a plurality of first convex blocks (304) distributed along a circumferential direction of the cymbal cover (3) and protruded downwardly; the second flange boss (303) is provided with a plurality of second convex blocks (305) distributed along the circumferential direction of the cymbal cover (3) and protruded upwardly; the second boss (401) is provided with a plurality of first grooves (402) for inserting the first convex blocks (304) and the second boss (401) is further provided with a plurality of second grooves (403) for inserting the second convex blocks (305).

4. The electronic cymbal of claim 3, wherein an outer edge of the cymbal cover (3) extends downwardly to form a turning edge (306) so as to form an annular cavity (307) for connecting an edge of the cymbal base (4).

5. The electronic cymbal of claim 4, wherein a plurality of upwardly-protruding third convex blocks (308) are disposed on the annular cavity (307), and a plurality of through grooves (404) for inserting the third convex blocks (308) are disposed on the cymbal base (4).

6. The electronic cymbal of claim 1, wherein the cymbal cover (3) and the cymbal base (4) form the cymbal body (2) through secondary injection molding.

7. The electronic cymbal of claim 1, wherein the support rod portion (1012) comprises a first waist portion (1013) and a second waist portion (1014) connected below the first waist portion (1013); the first waist portion (1013) is shaped like cone with an upper part being large and a lower part being small, and the second waist portion (1014) is cylindrical.

8. The electronic cymbal of claim 7, wherein the first waist portion (1013) is in the form of concave arc shape, and the external surfaces of the head portion (1011), the first waist portion (1013) and the second waist portion (1014) are smoothly transitioned.

9. The electronic cymbal of claim 8, wherein the upper end of the head portion (1011) is formed into a hemisphere.

10. The electronic cymbal of claim 2, wherein the cymbal cover (3) and the cymbal base (4) form the cymbal body (2) through secondary injection molding.

11. The electronic cymbal of claim 3, wherein the cymbal cover (3) and the cymbal base (4) form the cymbal body (2) through secondary injection molding.

12. The electronic cymbal of claim 4, wherein the cymbal cover (3) and the cymbal base (4) form the cymbal body (2) through secondary injection molding.

13. The electronic cymbal of claim 5, wherein the cymbal cover (3) and the cymbal base (4) form the cymbal body (2) through secondary injection molding.

* * * * *